US006796065B2

(12) United States Patent
Haas

(10) Patent No.: US 6,796,065 B2
(45) Date of Patent: Sep. 28, 2004

(54) TAB CLIP BADGE

(75) Inventor: David Haas, Suffern, NY (US)

(73) Assignee: Brady Worldwide, Inc., Milwaukee, WI (US)

( * ) Notice: Subject to any disclaimer, the term of this patent is extended or adjusted under 35 U.S.C. 154(b) by 38 days.

(21) Appl. No.: 10/123,069

(22) Filed: Apr. 13, 2002

(65) Prior Publication Data

US 2003/0014894 A1 Jan. 23, 2003

Related U.S. Application Data

(60) Provisional application No. 60/283,900, filed on Apr. 16, 2001.

(51) Int. Cl.$^7$ ................................................ G09F 3/18
(52) U.S. Cl. ................................ 40/661.04; 40/661.09
(58) Field of Search .......................... 40/606.01, 661.04, 40/661.09, 658, 666

(56) References Cited

U.S. PATENT DOCUMENTS

| | | | | |
|---|---|---|---|---|
| 610,807 A | * | 9/1898 | Grinsfelder | ............... 40/658 X |
| 1,687,859 A | * | 10/1928 | Fontaine | .............. 40/661.09 X |
| 2,124,054 A | * | 7/1938 | Corson | ........................ 40/658 |
| 4,392,315 A | * | 7/1983 | Irving et al. | |
| 4,801,514 A | * | 1/1989 | Will et al. | |
| 5,446,705 A | * | 8/1995 | Haas et al. | |
| 5,813,153 A | * | 9/1998 | Maglio | ..................... 40/666 X |
| 5,873,606 A | * | 2/1999 | Haas et al. | ................... 283/75 |

* cited by examiner

Primary Examiner—Joanne Silbermann
(74) Attorney, Agent, or Firm—Michael E. Zall

(57) ABSTRACT

A tab-clip identification badge for attachment to the clothing of a person. The badge includes a badge substrate having a front surface and a back surface. A tab is provided having an inner surface and an outer surface and an upper portion and a lower portion hingedly attached to the upper portion. The inner surface of the upper portion of the tab is fixedly mounted to the back surface of the badge substrate. When the badge is not in use, the lower portion of the tab covers a portion of the back surface of the badge substrate. When the badge is ready for use the lower portion of the tab can be lifted from the back surface of the badge. An adhesive coating is on the inner surface of the lower portion of the tab. When the badge is not in use the adhesive coating on the lower portion of the tab functions to adhesively and removably mount the lower portion of the tab to the portion of the back surface. When the badge is in use the adhesive coating on the lower portion of the tab functions to adhesively and removably mount the lower portion of the tab to a portion of the persons clothing, whereby the back surface of the badge is juxtaposed against the clothing and the front surface is capable of being viewed by an observer. Preferably, the badge is a time dependent badge wherein after activation and a predetermined period of time has passed a portion of the front of the badge changes color.

11 Claims, 7 Drawing Sheets

US 6,796,065 B2

TAB CLIP BADGE

CROSS REFERENCE TO RELATED APPLICATIONS

This application claims the benefit of Provisional Application U.S. Serial No. 60/283,900 filed on Apr. 16, 2001, the entire disclosure of which is incorporated herein by reference.

BACKGROUND OF THE INVENTION

1. Field of The Invention

This invention relates to an identification badge having a novel means of attachment, in particular a tab type clip at the rear of the badge.

2. Prior Art

Badges and passes must be visibly worn in facilities so that a visitor can enter and exit freely during the day, or return at other times. Badges and passes are not tickets. Tickets which are used for admission do not have to be remain visible while the visitor is in the facility. This desired visibility for badges and passes is particularly needed when there are no ticket takers at the doors of the facility. The visible pass confirms to the entry personnel and guards that the person has paid admission or is authorized to be in the facility.

The motivation for this invention, i.e., the tab clip badge, was provided by the needs of the users of known badges and the customers that purchase such badges in high volume for use by their customers or visitors. In particular, customers have requested low cost, easy to issue, clip-on passes and badges. The known badges and passes and systems for the use thereof, have numerous deficiencies. For example, self-adhesive badges and clip-on badges, are expensive to use when the total costs for relatively high volume uses are considered, e.g., museums, fairs, public events. These costs include, for example, the time needed for attachment, post use clean-up, damage to the user's apparel, damage to the facilities, etc.

More specifically, conventional passes and badges have numerous deficiencies, for example:

Self-Adhesive Badges/Passes

After use, these badges are found adhesively adhered to walls and floors, they are difficult to remove, and they present extra work for the cleaning crews. In museums, for example, children and vandals stick the badges to pictures, objects, and displays. Additionally, the badges can fall off and damage clothing, for example, leather jackets.

Clip-On Badges/Passes

These type badges/passes have a high initial and total cost. At a typical facility only about half of the badge holders and clips distributed are returned. Extra work is required to insert the badges in the badge holders or to attach the clip to the badge. Plastic badge holders are heavy and people do not like wearing them on tee shirts, women's blouses, etc.

Pin-On Buttons

Pin-on badges/passes have pins that are sharp, stick people, and are dangerous for children. The pins can damage clothing. The buttons may be too small, and if made larger become too heavy and the buttons cannot be written on. The metal pins on the buttons can be used to jam elevators and other doors and the pins and buttons can be an electrical hazard. In general, both the users and purchasers of these pin-on buttons do not like them.

OBJECTS AND SUMMARY OF INVENTION

It is an object of this invention to provide an identification badge or pass that is inexpensive and has substantially none of the deficiencies of the prior art badges or passes.

It is another object of this invention to provide a paper or plastic identification badge or pass that is constructed of a flexible material, such as paper or plastic, and can be effectively adhesively attached to a small interior area of the users clothing and after use can be disposed of with only a minimal possibility for adhesive attachment to other objects such as walls, displays, etc.

It is a further object of this invention to provide a paper or plastic identification badge or pass that is constructed of a flexible material, such as paper or plastic, and can be effectively adhesively attached to a small interior area of the users clothing by an adhesive that is on the interior of the badge or pass and thus can be disposed of with only a minimal possibility for adhesive attachment to other objects after use.

It is yet another object of this invention to provide a time dependent badge that changes color after a predetermined period of time after activation and that has a novel means for attachment to the person using the badge.

All of the foregoing objects, as well as others are accomplished by the identification badge of this invention. For brevity, this identification badge or pass will be called a "tab-clip badge." The identification badge is for attachment to the clothing of a person. The badge comprises:

a badge substrate having a front surface and a back surface, a tab having an inner surface and an outer surface and an upper portion and a lower portion hingedly attached to the upper portion, wherein the inner surface of the upper portion of the tab is fixedly mounted to the back surface of the badge substrate and the lower portion of the tab when the badge is not in use covers a portion of the back surface of the badge substrate and when the badge is ready for use can be lifted from the back surface of the badge, an adhesive coating on the inner surface of the lower portion of the tab, wherein when the badge is not in use the adhesive coating on the lower portion of the tab functions to adhesively and removably mount the lower portion of the tab to the portion of the back surface and when the badge is in use the adhesive coating on the lower portion of the tab functions to adhesively and removably mount the lower portion of the tab to a portion of the persons clothing, whereby the back surface of the badge is juxtaposed against the clothing and the front surface is capable of being viewed by an observer.

Preferably, the badge is a time dependent badge wherein after activation and a predetermined period of time has passed a portion of the front of the badge changes color.

BRIEF DESCRIPTION OF THE DRAWINGS

For a more complete understanding of the present invention, reference may be had to the following description of exemplary embodiments of the present invention considered in connection with the accompanying drawings, of which.

DETAILED DESCRIPTION OF THE INVENTION

Figure 1:
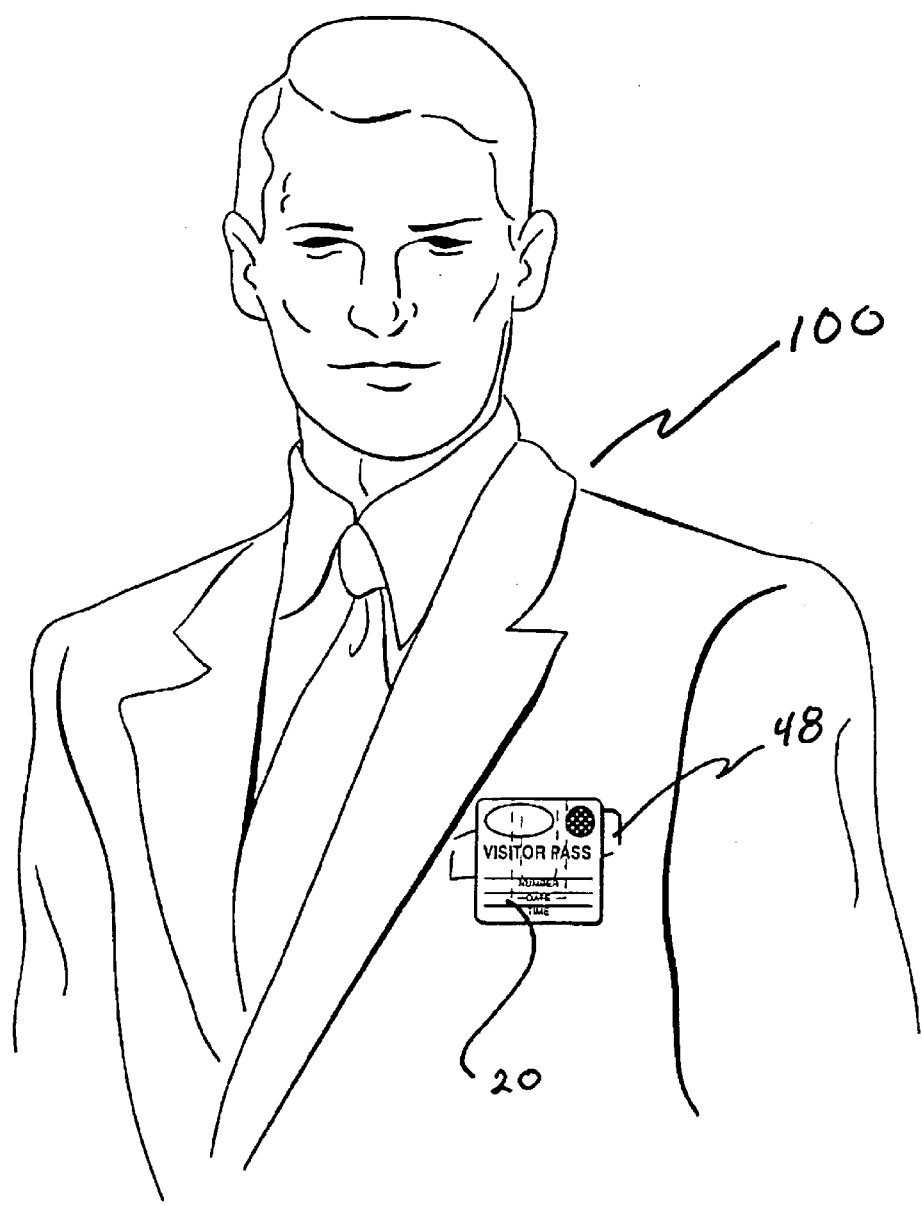
FIG. 1 shows a person wearing the tab-clip time dependant badge of this invention on a suit pocket.

FIG. 1 shows a person 100 wearing the tab-clip time dependant badge 20 of this invention on a suit pocket. In the preferred embodiment of this invention, the badge 20 is a time dependent badge that after activation and the passage of a predetermined period of time changes color to indicate that the badge has expired. Such badges and the technology to make such badges are well known in the art, see for example the products of Temtec, Inc, Suffern, N.Y. and the patents issued to this company, e.g., U.S. Pat. Nos. 6,295,252, 5,957,458, 5,930,206, 5,873,606, 5,862,101, 5,822,280, 5,785,354, 5,699,326, 5,633,835, 5,602,804, and 5,446,705, the entire disclosures of which are incorporated herein by reference.

Figure 10:
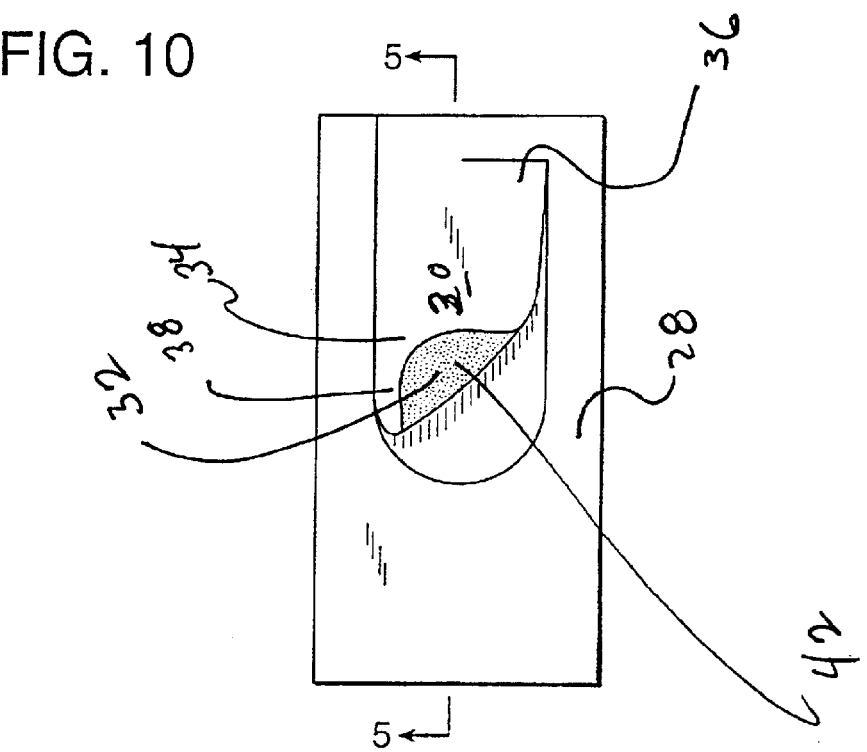
FIG. 10 shows the die-cut tab form that is placed on the back surface of the badge substrate just after displacing the tab from the rear for attachment of the badge to, for example, a pocket.
Figure 11:
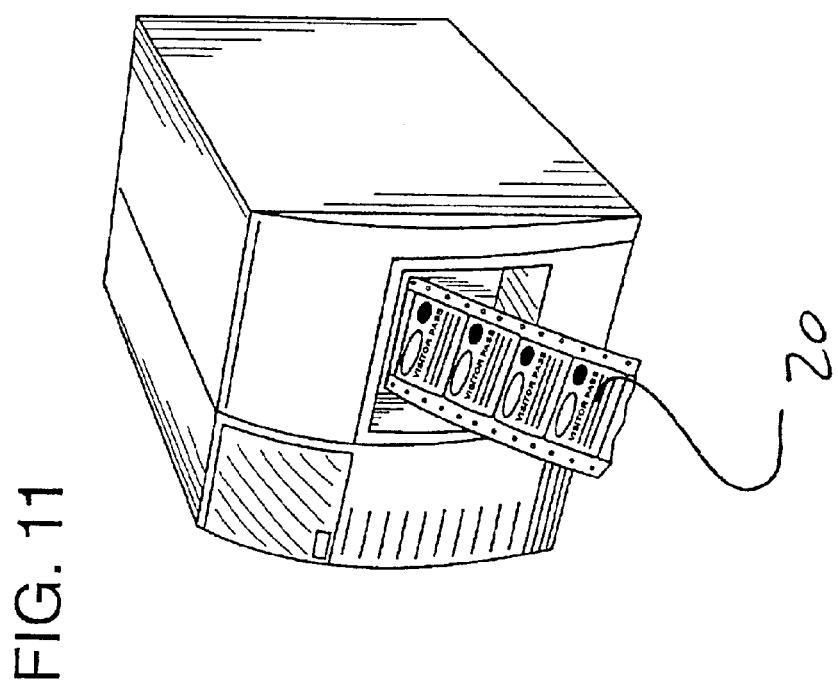
FIG. 11 shows the badges of this invention being printed with a pin-feed type printer.
Figure 12:
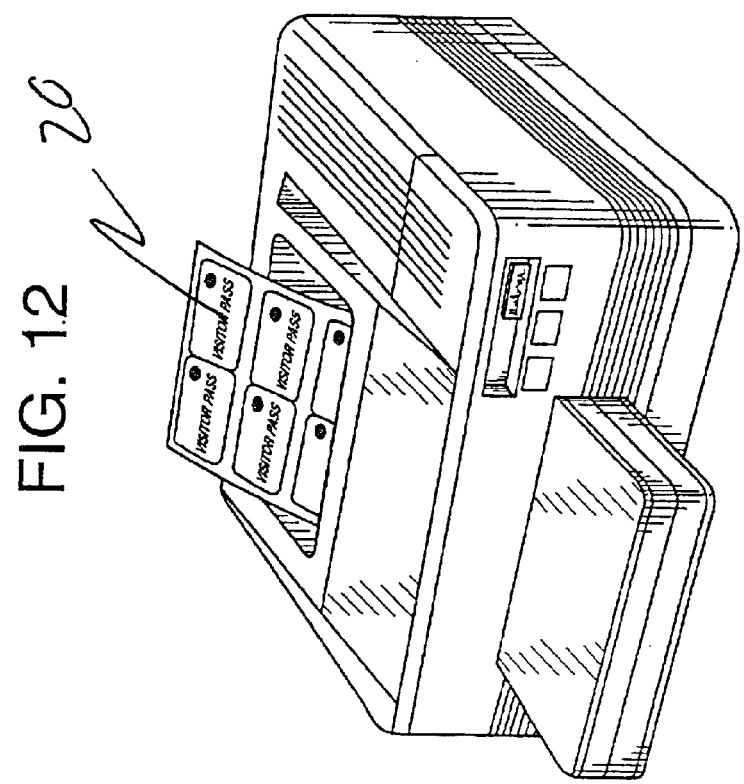
FIG. 12 shows the badges of this invention being printed with a laser printer.

Referring to FIGS. 2–5, 9 and 10, a preferred embodiment the tab-clip badge 20 of this invention is shown. The badge substrate 22 has a front surface 24 and a back surface 26. Attached to the back surface 26, preferably by an adhesive coating, is a plastic die-cut tab form 28. A tab 30 is cut from the form 28. The tab 30 has an inner surface 32 and an outer surface 34 and an upper portion 36 and a lower portion 38 hingedly attached at 40 to the upper portion. The inner surface 32 of the upper portion 36 of the tab 30 is fixedly mounted to the back surface 26 of the badge substrate 22. When the badge 20 is not in use, i.e., prior to attachment to the users clothing or afterwards, the lower portion 38 of the tab 30 covers a portion of the back surface 26 of the badge substrate 22 (FIG. 9) and when the badge 20 is ready for use the lower portion 38 of the tab 30 can be lifted from the back surface 26 of the badge 20 (FIG. 10). An adhesive coating 42 is on the inner surface 32 of the lower portion 38 of the tab 30.

When the badge 20 is not in use the adhesive coating 42 on the lower portion 38 of the tab 30 functions to adhesively and removably mount the lower portion 38 of the tab 30 to the portion of the back surface 26 and when the badge 20 is in use, i.e., attached to the clothing 48 of a person (see FIG. 5) the adhesive coating 42 on the lower portion 38 of the tab 30 functions to adhesively and removably mount the lower portion 38 of the tab 30 to a portion of the persons clothing 48, whereby the back surface 26 of the badge is juxtaposed against the clothing 48 and the front surface 24 is capable of being viewed by an observer.

In order to use the badge 20, the user simply lifts the lower portion 38 of the tab 30 from the back surface 26 of the badge substrate 22, passes it over any edge of his/her garment 48, and then presses the lower portion 38 of the tab 30 against the garment 48 material so that the adhesive 42 from the lower portion 38 of the tab 30 attaches to the garment 48. This secures the badge or pass 20 to the individuals garment 48 by both a "hook attachment means" and an "adhesive attachment means." If by chance, the adhesive 42 does damage the garment material 48, either by leaving adhesive attached to the garment 48, by pulling threads therefrom or discoloration thereof, the damage occurs to the rear surface of the material of the garment 48 which is not visible.

Figure 2:
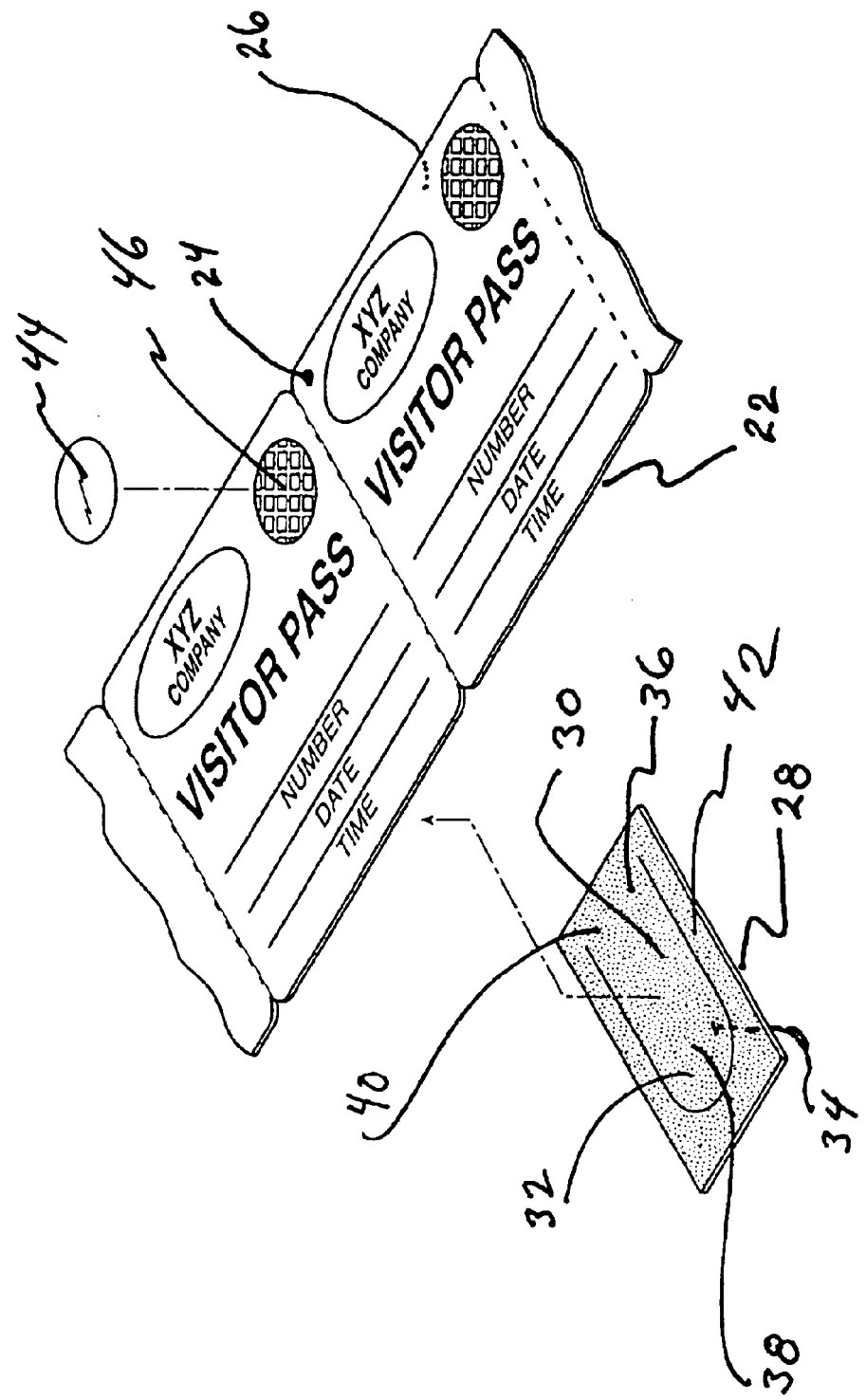
FIG. 2 shows a break away perspective of the embodiment of the time dependant tab-clip badge of this invention shown in FIG. 1.
Figure 3:
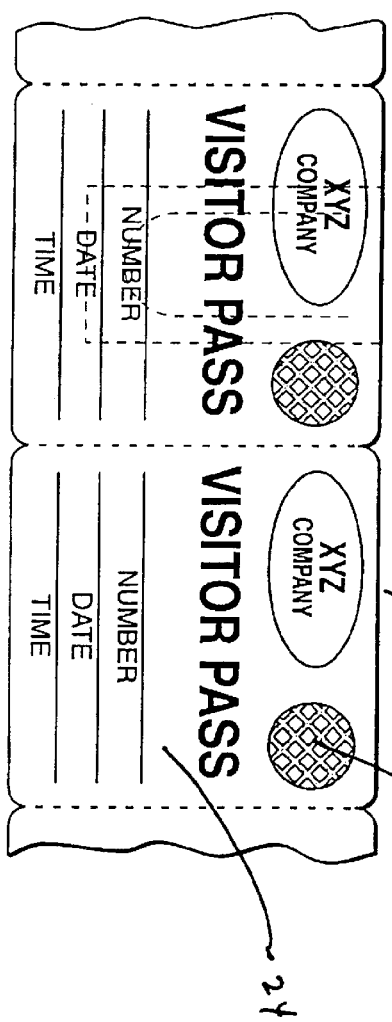
FIG. 3 shows a front view of the badge shown in FIG. 2.
Figure 4:
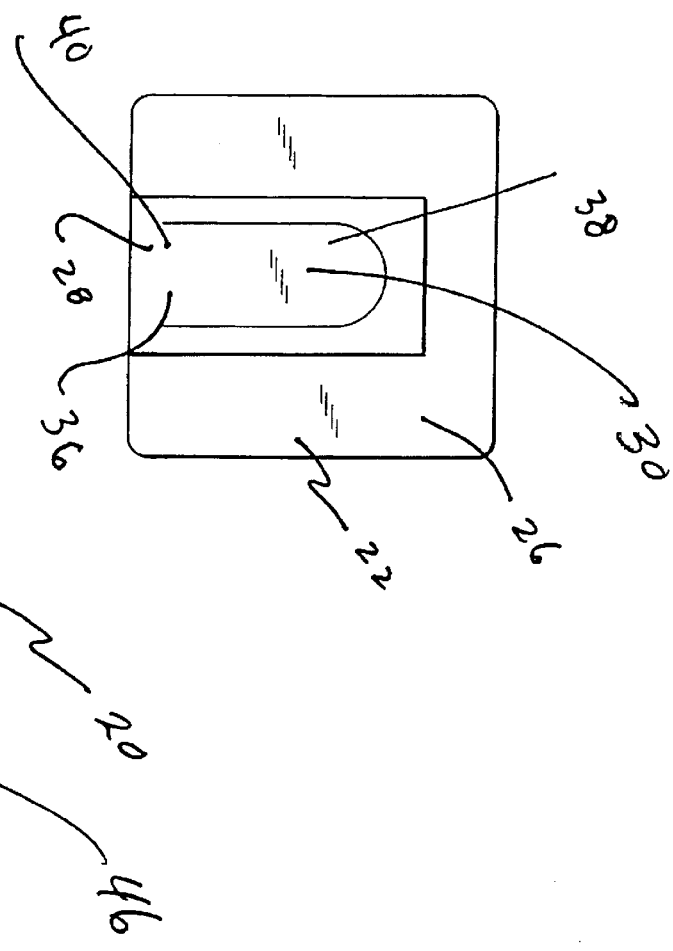
FIG. 4 shows a rear view of the badge shown in FIG. 2.
Figure 5:
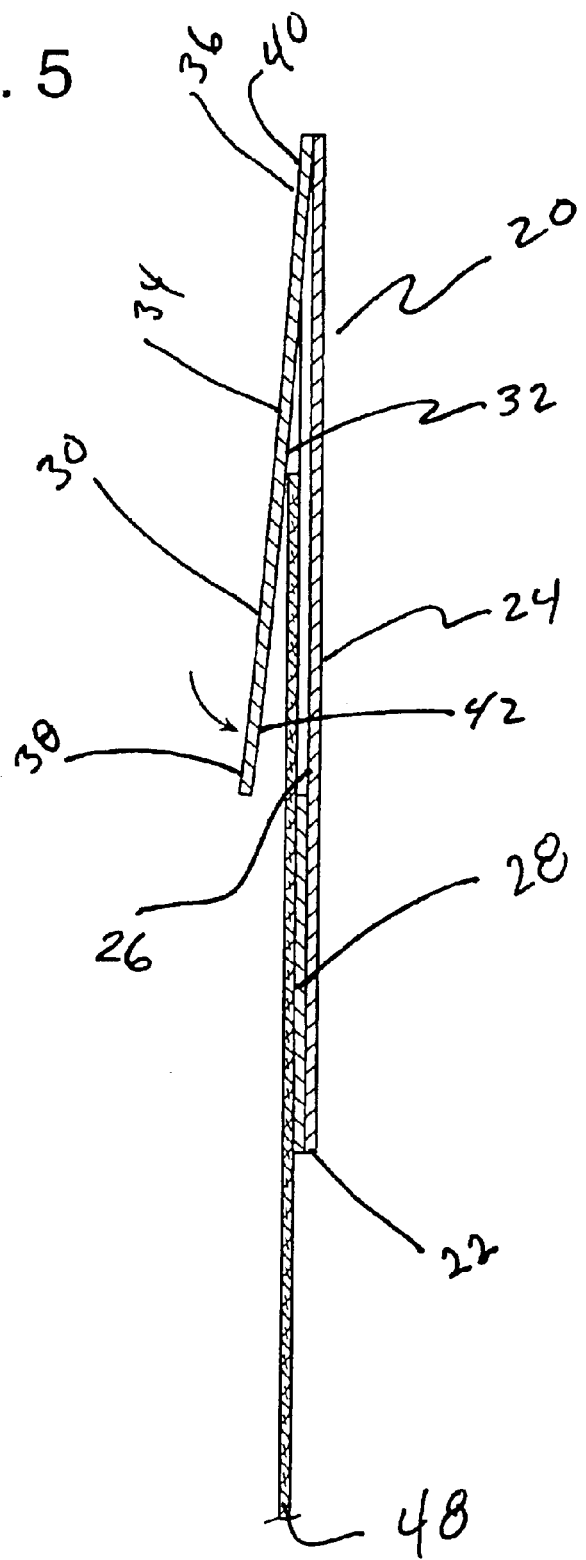
FIG. 5 shows a cross-sectional view of the tab-clip badge of this invention shown in FIG. 1, taken along line 5—5 of FIG. 10.

FIG. 2 shows a break away perspective of the embodiment of the time dependant tab-clip badge of this invention shown in FIG. 1. In this embodiment a token 44 is adhesively applied over a migrating ink area 46 to activate the time dependency function. Upon the passage of a predetermined period of time, i.e., expiration, the migrating ink area 46 migrates through the token 44 to indicate expiration.

A further advantage of this invention is that the adhesive 42 on the tab is facing inward or to the back surface 26 of the badge or pass 20. Thus if the pass 20 is dropped on the floor, the adhesive 42 will not be exposed and cannot stick to the floor. This 'hidden adhesive' concept makes the tab-clip badge 20 much more attractive than the prior art self-adhesive badges.

Another advantage of the tab-clip badges 20 of this invention is that they can be made from flexible plastic and/or paper materials which are much less expensive than metal or plastic clips. Thus the badges or passes of this invention are substantially less expensive than metal or plastic clips and badges.

Because the tab-clip badges 20 of this invention are preferably constructed of flexible thin film materials, they can be manufactured on web presses at high speeds. This substantially reduces the cost of the product compared to molded or formed plastic clips that are produced relatively slowly.

Referring to the Figures, the tab 30 must be rigid and thick enough for a person to lift the lower portion 38 of the tab 30, which is removably and adhesively attached to a portion of the back surface 26. It has been found that a tab 30 thickness of about 7-10 mils is adequate. In addition, because the tab 30 will be pulled with different forces depending on the person using the badge or pass 20, it should preferably be tear resistant. Thus, paper and brittle materials such as acetate are not preferred. Recently a new variety of film materials have become available that have been specifically designed for tear resistance: polyethylene films and Valerian, a cross-extruded polyolefin. These low cost materials are ideal for this application.

In order to enable the tab 30 to attach to a wide variety of fabrics 48, the adhesive 42 must be a permanent type adhesive at least 2 mils thick. A thick adhesive can flow between the threads of the fabric to generate large surface areas of contact. This is a well known property in the adhesive industry.

In addition, it is preferred that all corners of the die-cut tab form 28 be rounded and have a minimum sharp corners to minimize tearing when the tab 30 is displaced. This requires that the tab 30 be cut with rounded corners. Such techniques and factors are well known in the die-cutting industry.

The tab clip badge or pass of this invention 20, is a temporary visitor/guest pass that is visibly attached to the clothing of all visitors. It is easily seen, safe, low cost, easy to issue, easy to attach to clothing, does not have exposed adhesive that will stick to objects, and may be made in, for example, 1-day self-expiring or non-expiring badges. The preferred specifications for the tab 30 are as follows:

Shape: rectangular 1¼" wide by 2½" high, with rounded corners on top

Material: Two layer construction, the face material being 6 mil cardstock, and the back material being tear-resistance polyethylene film. No sharp edges Attachment means: A die-cut tab form 28 on the back surface 26 of the badge substrate with adhesive coating 42 on the inside; the tab 30 hooks over the edge of a garment 48 and the adhesive 42 attaches to the inside of the garment 48.

Preferred Embodiments of the Badges/Passes

Figure 6:
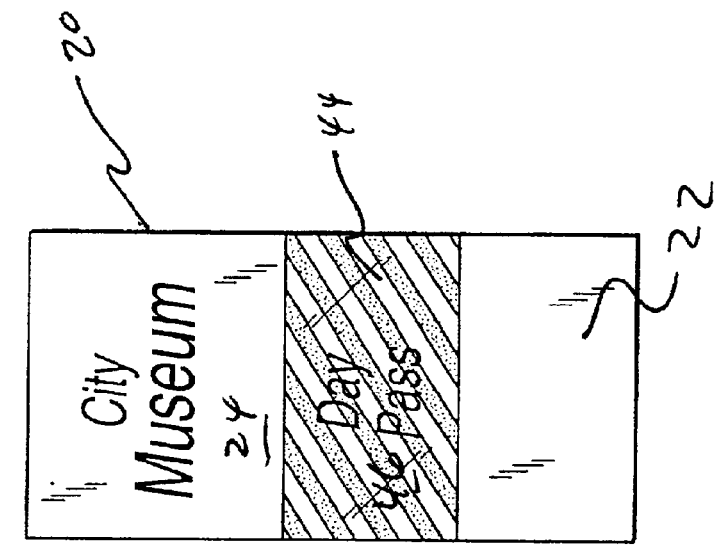
FIG. 6 shows the front of another embodiment of a time dependant tab-clip badge of this invention prior to activation.
Figure 7:
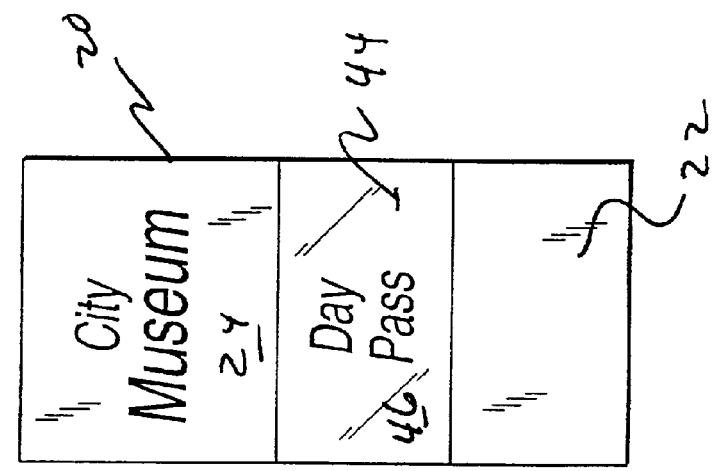
FIG. 7 shows the front of the time dependant tab-clip badge of FIG. 6 just after activation.
Figure 8:
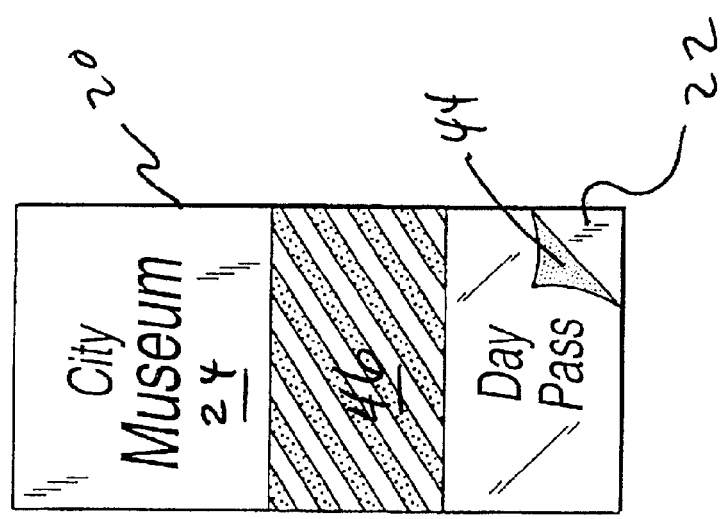
FIG. 8 shows the front of the time dependant tab-clip badge of FIGS. 6 and 7 after a predetermined period of time has lapsed and the badge has expired.
Figure 9:
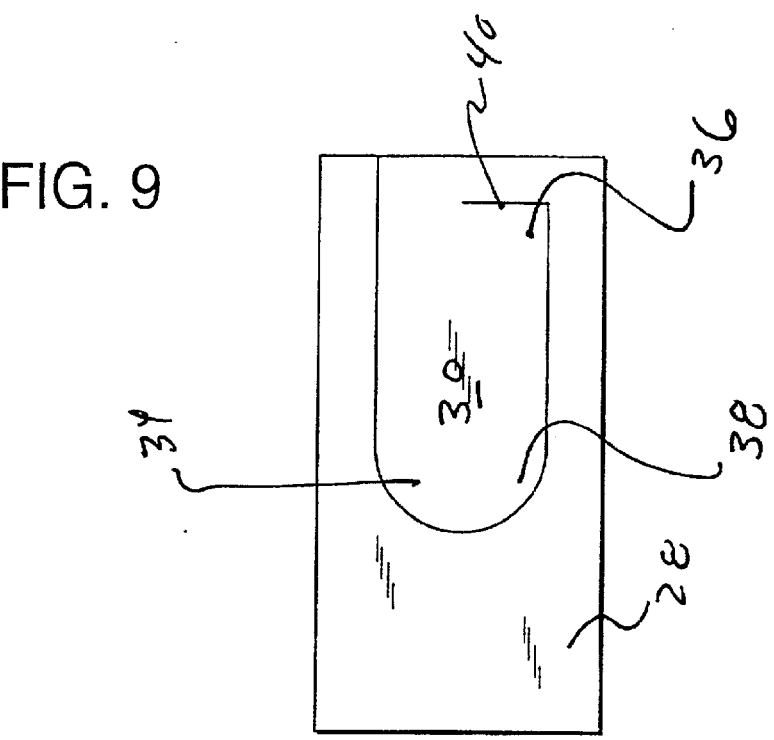
FIG. 9 shows the die-cut tab form that is placed on the back surface of the badge substrate just it prior to displacing the tab from the back surface for attachment of the badge to, for example, a pocket.

Self-Expiring Time 1-Day Pass (see FIGS. 6–8).

Time sensitive front part attached at bottom as ¾"×1¼" band 44.

Migrating ink printed in middle as ¾"×1¼" band 46.

Logo or generic name printed at top as a as ¾"×1¼" band.

Referring to FIGS. 6–8, token element 44 is removably and adhesively attached to the front surface 24 of the badge substrate 22. The token element 44 is peeled therefrom and then is adhesively applied over migrating ink section 46. As the ink migrates through the token element 44, the badge 20 eventually indicates that it is expired. This occurs after the passage of a predetermined period of time after activation, see FIG. 8.

Optionally a light sensitive coating may be placed on the front surface of the badge substrate at bottom as a 1"×1¼" band. A logo or generic name printed at top as a as 2"×1¼" band.

The tab-clip badge 20 of this invention provides numerous benefits over the prior art:

Each pass is flat, thus occupying a minimum of volume and permitting convenient packaging in the smallest size packages. Rigid clips occupy large volumes of space and must be handled individually Passes can be rolled, fan-folded, or cut into sheets like paper labels. This is not possible with rigid clips.

Because the passes can be on a continuous web, they can be sequentially serialized for easy counting and audit accountability.

With the adhesive attachment, fewer passes will fall off of visitors. Also, passes can be attached to children's clothing more easily than clip-on type passes.

Because of the web construction of the tab-clip badges of this invention, the passes can be produced both as self-expiring and non-expiring varieties.

Tab-clip badges of this invention are less expensive than rigid clip products.

It will be understood that various changes in the details, arrangements and configuration of the parts and assemblies which have been described and illustrated may be made by those skilled in the art within the principle and scope of the present invention.

What is claimed is:

1. An identification badge to identify a person for attachment to clothing worn by the person, the badge comprising:

a badge substrate having a front surface and a back surface, the front surface having identification indicia thereon to identify the person:

a tab having an inner surface and an outer surface and an upper portion and a lower portion hingedly attached to the upper portion, wherein the inner surface of the upper portion of the tab is fixedly mounted to the back surface of the badge substrate and the lower portion of the tab when the badge is not in use covers a portion of the back surface of the badge substrate and when the badge is ready for use can be lifted from the back surface of the badge, an adhesive coating on the inner surface of the lower portion of the tab, wherein when the badge is not in use the adhesive coating on the lower portion of the tab functions to adhesively and removably mount the lower portion of the tab to the portion of the back surface and when the badge is in use the adhesive coating on the lower portion of the tab functions to adhesively and removably mount the lower portion of the tab to a portion of the persons clothing, whereby the back surface of the badge is juxtaposed against the clothing and the front surface is capable of being viewed by an observer.

2. The identification badge of claim 1, wherein the badge is a time dependent badge.

3. The identification badge of claim 1, wherein the badge is a time dependent badge wherein after activation and a predetermined period of time has passed a portion of the front of the badge changes color.

4. The identification badge of claim 1, wherein the badge substrate and tab comprise flexible materials.

5. The identification badge of claim 1, wherein the tab comprise flexible tear resistant material.

6. An identification badge for attachment to clothing worn by a person, the badge comprising:

a badge substrate having a front surface and a back surface, wherein the badge substrate comprises a polymeric substrate adhered to a paper substrate, the polymeric substrate including the back surface and the paper substrate including the front surface, a tab having an inner surface and an outer surface and an upper portion and a lower portion hingedly attached to the upper portion, wherein the inner surface of the upper portion of the tab is fixedly mounted to the back surface of the badge substrate and the lower portion of the tab when the badge is not in use covers a portion of the back surface of the badge substrate and when the badge is ready for use can be lifted from the back surface of the badge, an adhesive coating on the inner surface of the lower portion of the tab, wherein when the badge is not in use the adhesive coating on the lower portion of the tab functions to adhesively and removably mount the lower portion of the tab to the portion of the back surface and when the badge is in use the adhesive coating on the lower portion of the tab functions to adhesively and removably mount the lower portion of the tab to a portion of the persons clothing, whereby the back surface of the badge is juxtaposed against the clothing and the front surface is capable of being viewed by an observer.

7. The identification badge of claim 6, wherein the badge is a time dependent badge.

8. The identification badge of claim 6, wherein the badge is a time dependent badge wherein after activation and a predetermined period of time has passed a portion of the front of the badge changes color.

9. The identification badge of claim 6, wherein the badge substrate and tab comprise flexible materials.

10. The identification badge of claim 6, wherein the tab comprise flexible tear resistant material.

11. An identification badge for attachment to clothing worn by a person, the badge comprising:

a badge substrate having a front surface and a back surface, wherein the badge substrate comprises a tear resistant polyethylene substrate adhered to a card stock substrate, the polyethylene substrate including the back surface and the card stock substrate including the front surface a tab having an inner surface and an outer surface and an upper portion and a lower portion hingedly attached to the upper portion, wherein the inner surface of the upper portion of the tab is fixedly mounted to the back surface of the badge substrate and the lower portion of the tab when the badge is not in use covers a portion of the back surface of the badge substrate and when the badge is ready for use can be lifted from the back surface of the badge, an adhesive coating on the inner surface of the lower portion of the tab, wherein when the badge is not in use the adhesive coating on the lower portion of the tab functions to adhesively and removably mount the lower portion of the tab to the portion of the back surface and when the badge is in use the adhesive coating on the lower portion of the tab functions to adhesively and removably mount the lower portion of the tab to a portion of the persons clothing, whereby the back surface of the badge is juxtaposed against the clothing and the front surface is capable of being viewed by an observer.

\* \* \* \* \*